(12) United States Patent
Theobald

(10) Patent No.: US 9,919,420 B1
(45) Date of Patent: Mar. 20, 2018

(54) MOBILE ROBOT FOR RECEIVING TASK SELECTION(S) RELATED TO ELECTRONICALLY PRESENTED INFORMATION

(71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 752 days.

(21) Appl. No.: 13/905,229

(22) Filed: May 30, 2013

(51) Int. Cl.
*G06F 19/00* (2011.01)
*B25J 9/16* (2006.01)
*B25J 5/00* (2006.01)

(52) U.S. Cl.
CPC .................. *B25J 9/161* (2013.01); *B25J 5/00* (2013.01); *Y10S 901/01* (2013.01)

(58) Field of Classification Search
CPC ............. B25J 9/161; B25J 5/00; Y10S 901/01
USPC ............... 700/257, 259, 254, 253, 213, 245; 705/26, 14.53; 709/226, 224, 201
See application file for complete search history.

(56) References Cited

U.S. PATENT DOCUMENTS

| 7,348,747 | B1 | 3/2008 | Theobald | |
|---|---|---|---|---|
| 7,719,222 | B2 | 3/2010 | Theobald | |
| 7,902,784 | B1 | 3/2011 | Theobald | |
| 8,447,863 | B1* | 5/2013 | Francis et al. | 709/226 |
| 2002/0165638 | A1* | 11/2002 | Bancroft et al. | 700/213 |
| 2009/0177323 | A1* | 7/2009 | Ziegler et al. | 700/259 |
| 2011/0163160 | A1* | 7/2011 | Zini et al. | 235/385 |
| 2011/0172822 | A1* | 7/2011 | Ziegler et al. | 700/259 |

* cited by examiner

*Primary Examiner* — Ronnie Mancho
(74) *Attorney, Agent, or Firm* — Albert J. Brunett

(57) ABSTRACT

Mobile robots and methods involving mobile robots are provided. One of the mobile robots electronically presents information using a user interface, where the information is indicative of at least one task. The user interface, for example, may present the information in a visual form with a display screen. The user interface receives a selection of the task. The mobile robot thereafter autonomously performs at least a portion of the selected task.

9 Claims, 11 Drawing Sheets

MOBILE ROBOT FOR RECEIVING TASK SELECTION(S) RELATED TO ELECTRONICALLY PRESENTED INFORMATION

BACKGROUND OF THE INVENTION

1. Technical Field

The present invention relates generally to robotics and, more particularly, to providing commands to a mobile robot.

2. Background Information

A robotic device may perform a task based on command data. This command data may be preloaded into a memory of the robotic device. Alternatively, the command data may be provided in real time to the robotic device from a remote control. The command data typically includes relatively large and complex vectors and/or matrices. These vectors and matrices typically provide information regarding the device's operating environment and/or instructions on how to perform the task; e.g., move one or more of the robotic device's actuators. It may be difficult therefore for individuals to write or otherwise compile command data for such a robotic device without first receiving specialized robotics training, which may be time consuming and expensive.

SUMMARY OF THE DISCLOSURE

Mobile robots and methods involving mobile robots are provided. One of the mobile robots electronically presents information using a user interface, where the information is indicative of at least one task. The user interface, for example, may present the information in a visual form with a display screen. The user interface receives a selection of the task. The mobile robot thereafter autonomously performs at least a portion of the selected task.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
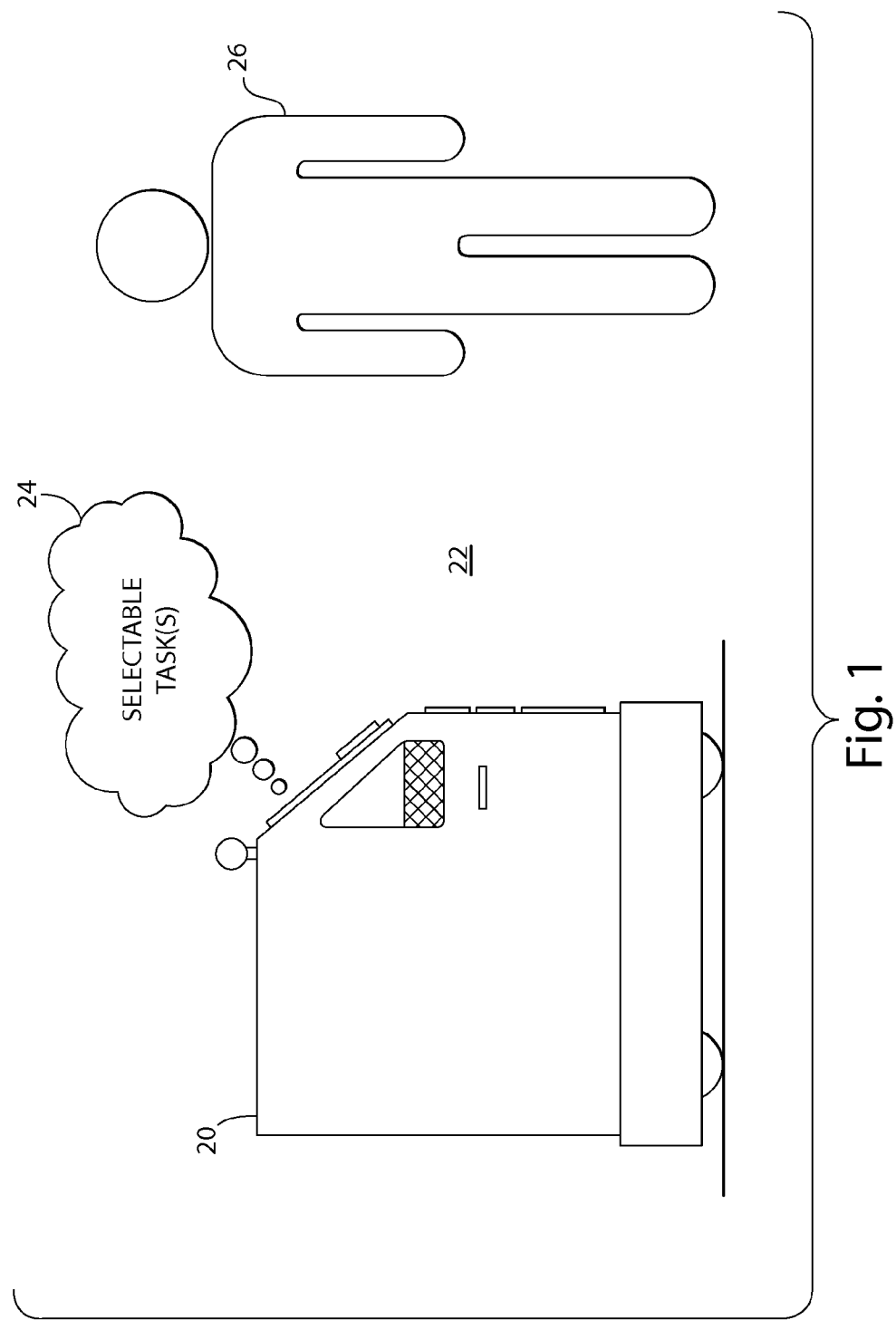
FIG. 1 is a block diagram of a mobile robot interacting with an individual.

FIG. 1 illustrates a mobile robot 20 within an operating environment 22. The mobile robot 20 is adapted to electronically present information 24 to an individual 26 (or individuals). This information 24 is indicative of one or more selectable tasks, and may be presented in a visual, audible and/or tactile form. The mobile robot 20, for example, may visually display icons or other graphics indicative of the selectable tasks. The mobile robot 20 may also or alternatively visually, audibly and/or tactilely present descriptions of the selectable tasks.

The mobile robot 20 is adapted to receive at least one selection of at least one of the tasks from the individual(s) 26. The mobile robot 20 is also adapted to partially or completely autonomously perform the selected task(s) in response to receiving the selection(s) made by the individual(s) 26.

Figure 2:
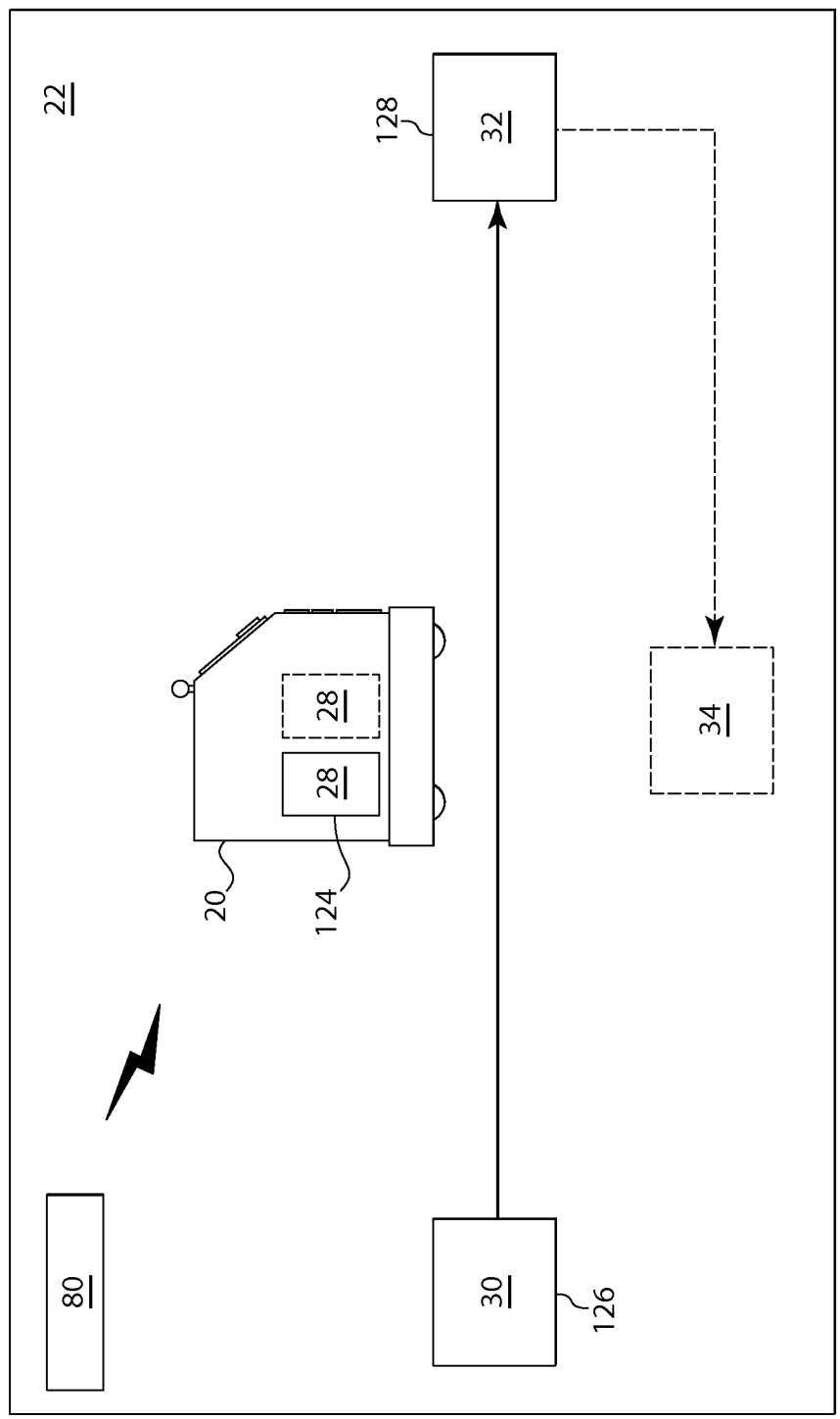
FIG. 2 is a block diagram of the mobile robot performing a task within an operating environment.

Referring to FIG. 2, the selectable task(s) may include one or more tasks related to ordering one or more items 28 and/or partially or completely fulfilling one or more item orders. The mobile robot 20, for example, may autonomously pickup (e.g., gather) or otherwise receive the item(s) 28 at a pickup location 30 (or pickup locations). The mobile robot 20 may autonomously transport the item(s) 28 from the pickup location(s) 30 to one or more drop off locations 32 and 34. The mobile robot 20 may autonomously deliver or otherwise provide the item(s) 28 at the drop off location(s) 32 and 34. The mobile robot 20 may also preorder the item(s) 28 to be ready for the pickup at the pickup location(s) 30. Alternatively, the mobile robot 20 may place at least one order for one or more items to be transported and/or delivered to the drop off location(s) by or in conjunction with another mobile robot and/or an individual (e.g., a courier).

The selectable task(s) may also or alternatively include one or more tasks other than those related to item ordering and ordered item fulfillment. The mobile robot 20, for example, may transport an individual (or individuals) between predetermined and/or non-predetermined locations (e.g., 30, 32 and 34) within the operating environment 22. The individual(s) may be transported on a transit device such as wheelchair, a gurney or a passenger trailer, where the transit device may be pushed or pulled by the mobile robot 20. In addition or alternatively, the mobile robot 20 may include one or more supports (e.g., seats or platforms) for supporting the individual(s) during transport. The mobile robot 20 may also or alternatively perform one or more other services for the individual(s) such as, for example, a check in service, a check out service, a concierge service, and a housekeeping service.

The mobile robot 20 may perform one or more additional tasks during and/or between its performance of the task(s) selected by the individual(s) 26. The mobile robot 20, for example, may perform a maintenance task. An example of a maintenance task is autonomously moving to and/or autonomously docking at a power station. At the power station, depleted power storage device(s) (e.g., batteries, fuel tank, etc.) that power one or more components of the mobile robot 20 may be charged, replaced and/or filled. Another example of a maintenance task is autonomously scheduling maintenance and/or autonomously moving to a maintenance location (e.g., a service bay) to receive one or more maintenance services from a technician(s). The mobile robot 20, of course, may also or alternatively perform various other tasks than those described above.

The operating environment 22 of the mobile robot 20 may be or include one or more areas within and/or outside of a publicly (e.g., government) and/or privately owned and/or operated facility. Examples of such a facility include, but are not limited to, a warehouse, an office, a hospital, an airport, a shipping depot, a train station, a lodging business (e.g., a resort, a hotel, etc.), a residential structure (e.g., a house), a temporary structure (e.g., a tent), and a subterranean structure. The operating environment 22 may include one or more roadways, pathways, etc. The operating environment 22 may include one or more areas on a parcel of land of a storage yard, a shipping yard, a parking lot, a military base, or any other type of outdoor or indoor/outdoor facility. The operating environment 22 may include one or more areas onboard a train, an aircraft, a spacecraft, a ship, a submersible, or any other type of vehicle or vessel. The operating environment 22 may also or alternatively include one or more areas other than those described above.

The operating environment 22 may include one or more devices which may be used, manipulated and/or otherwise controlled by the mobile robot 20 during and/or between performance of its task(s). The operating environment 22, for example, may include a transportation device such as an elevator, an escalator or a moving walk. The mobile robot 20 may ride the transportation device to move between various areas (e.g., floors) within the operating environment 22. The operating environment 22 may include at least one door which the mobile robot 20 may autonomously open and/or close. The mobile robot 20, for example, may physically open and/or close the door with its manipulator system. Alternatively, the mobile robot 20 may signal an actuator connected to the door to open and/or close the door. The operating environment 22, of course, may also or alternatively include one or more devices other than those described above, which may be used, manipulated and/or otherwise controlled by the mobile robot 20 during and/or between performance of its task(s).

The mobile robot 20 is configured as an autonomous mobile robot that performs one or more tasks without continuous outside control and/or intervention. The mobile robot 20, for example, may receive instructions to perform a certain task at a certain location such as, for example, to deliver an item at a drop off location. The mobile robot 20 may subsequently determine and perform the operation(s) necessary to complete the task based on, for example, its current location, surrounding obstacles, its operating environment, the type of task to be performed, etc. The mobile robot 20 may also adapt to unknown, new and/or changing operating environments without additional outside control and/or intervention.

The mobile robot 20 may be fully autonomous during performance of one or more tasks. The mobile robot 20 may be semi-autonomous during performance of one or more tasks. The mobile robot 20 may also or alternatively be (e.g., remote) controlled by an operator (e.g., a human controller) during performance of one or more tasks.

The term "fully autonomous" may describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, etc.

Figure 3:
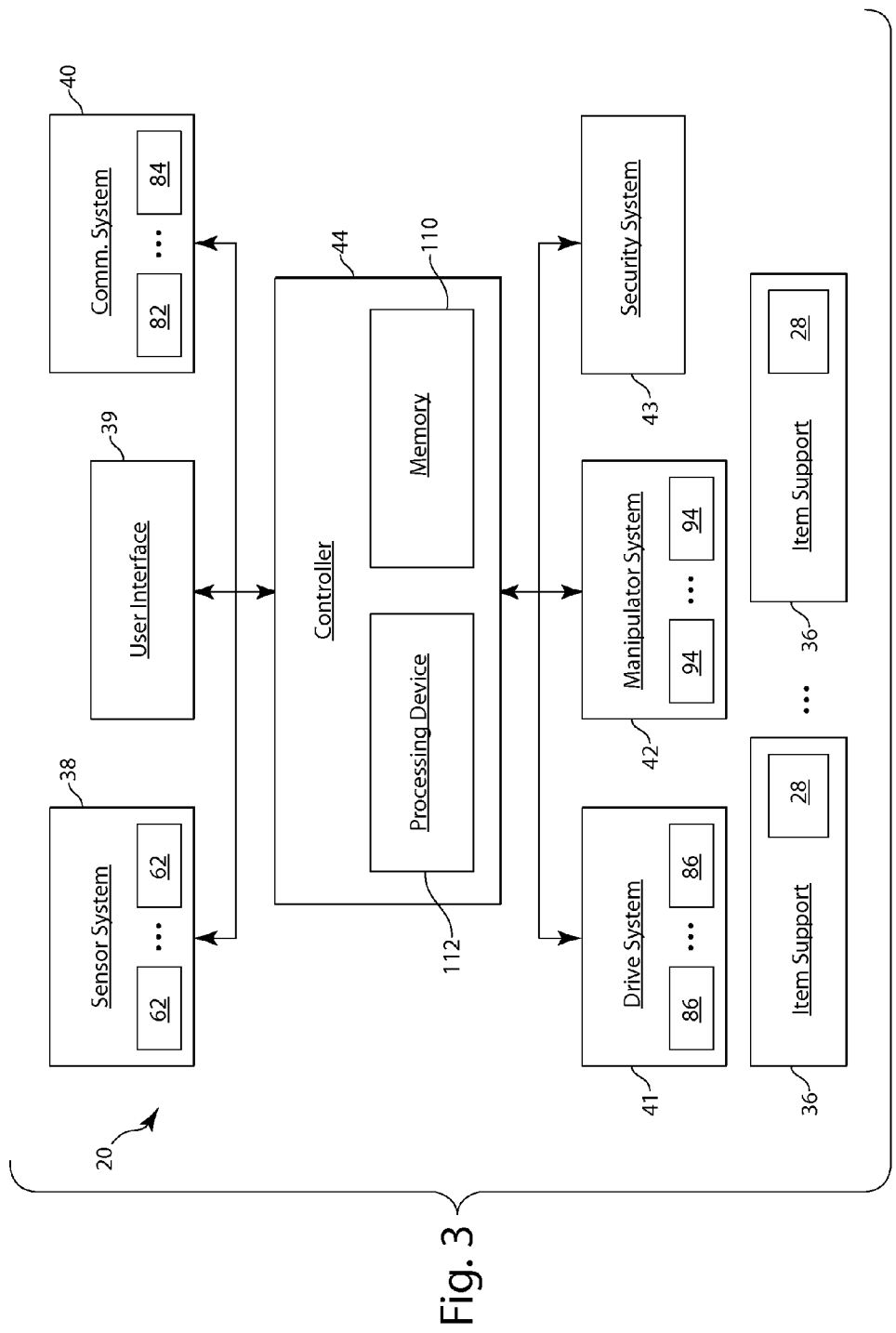
FIG. 3 is a block diagram of components included with the mobile robot.

FIG. 3 is a block diagram of the mobile robot 20. The mobile robot 20 includes one or more item supports 36. The mobile robot 20 also includes a sensor system 38, a user interface 39, a communication system 40, a drive system 41, a manipulator system 42, a security system 43, and a controller 44. One or more of these components 38-44 may each be a discrete (e.g., self-contained) unit, or configured with one or more of the other components 38-44.

Figure 5:
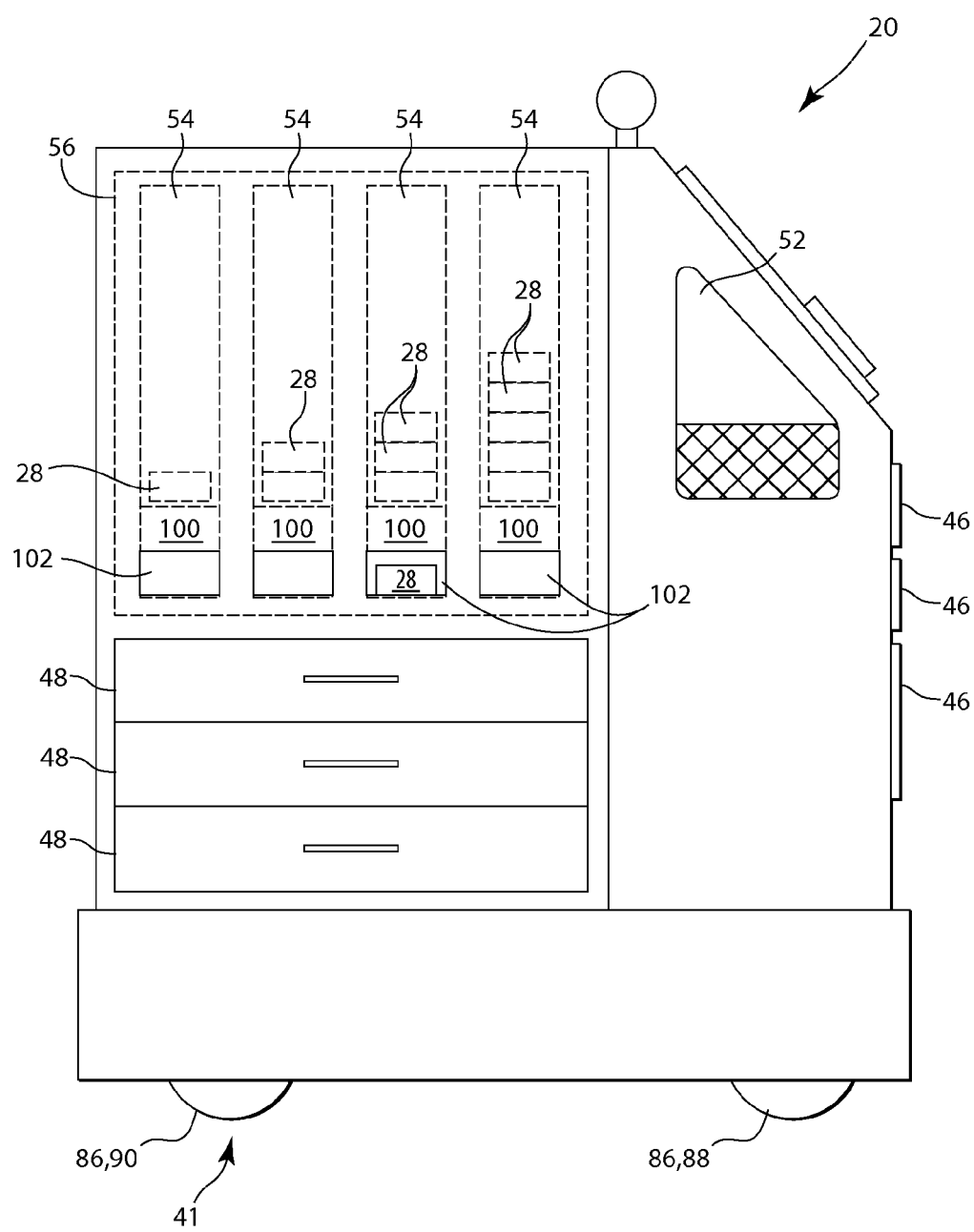
FIG. 5 is a side illustration of another embodiment of the mobile robot.
Figure 6:
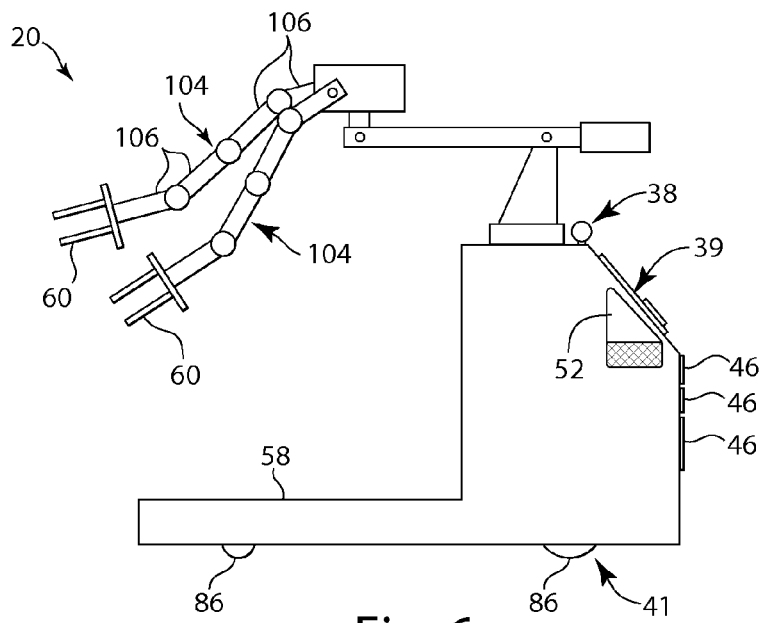
FIG. 6 is a side illustration of another embodiment of the mobile robot.
Figure 7:
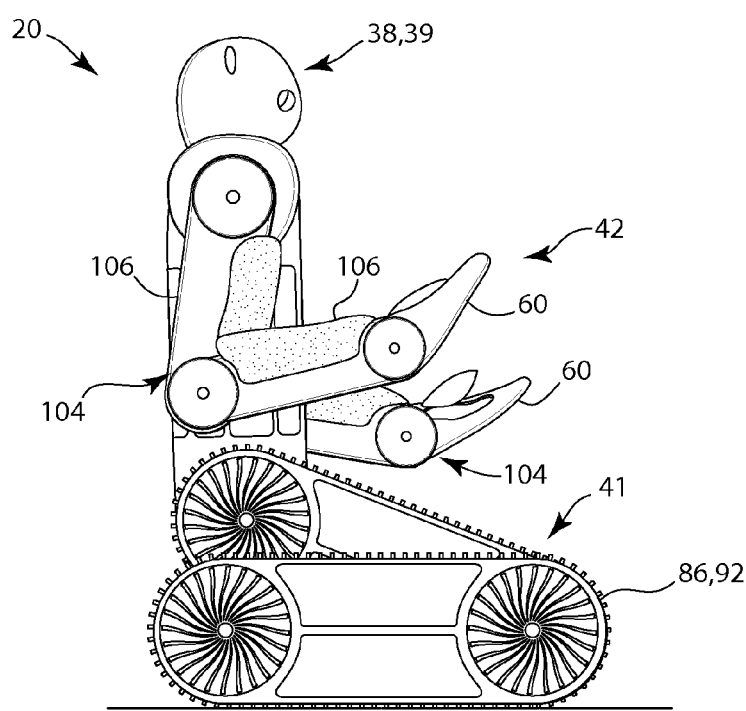
FIG. 7 is a side illustration of another embodiment of the mobile robot.

Each of the item supports 36 is adapted to securely or accessibly hold, contain and/or otherwise support one or more of the items 28. For example, referring to FIG. 4, one or more of the item supports 36 may each be configured as a drawer 46 and 48 (e.g., cabinet drawer). One or more of the item supports 36 may each be configured as a shelf within, or a base of, a cabinet interior (e.g., a cubby), which may be opened and closed using at least one cabinet door 50. At least one of the item supports 36 may be configured as an exterior compartment 52 such as, for example, a cubby or a pocket. Referring to FIG. 5, one or more of the item supports 36 may each be configured as an internal compartment 54 for a component (e.g., a dispenser 56) of the manipulator system 42. Referring to FIG. 6, at least one of the item supports 36 may be configured as a platform 58 such as, for example, a deck, a bed, or a pallet arranged with a pallet jack of the mobile robot 20. Referring to FIGS. 6 and 7, one or more of the item supports 36 may each be configured as a component (e.g., an end effector 60) of the manipulator system 42.

The mobile robot 20 may also or alternatively include various item supports 36 other than those described above and illustrated in the drawings. For example, the mobile robot 20 may include an item support configured as or arranged within a climate controlled (e.g., refrigerated) container. In this manner, the mobile robot 20 may transport or otherwise hold (e.g., perishable) items for a relatively long time between receiving and delivering the items. The mobile robot 20 therefore is not limited to any particular item support configurations.

Referring to FIGS. 2 and 3, the sensor system 38 is adapted to survey the operational environment 22 of the mobile robot 20; e.g., room(s) and/or hallway(s) of the facility. The sensor system 38 is also or alternatively adapted to receive location data. This location data is indicative of a location of the mobile robot 20 within the operating environment 22 and/or location(s) of other object(s) within the operating environment 22. Examples of an object include, but are not limited to, a person, an animal, a wall, a threshold, a step, a door, or any other type of obstruction or landmark.

Referring to FIG. 3, the sensor system 38 includes one or more locator sensors 62. These locator sensors 62 are adapted to spatially locate (e.g., triangulate) the mobile robot 20 relative to, for example, its surrounding environment, its geographic location, and/or one or more locators (e.g., RF tags, physical landmarks, etc.). Examples of the locator sensor 62 include, but are not limited to, a proximity sensor, a global positioning system (GPS) receiver, a radar system, an infrared system, a laser system, a radio transceiver, and a visual location system with at least one camera 64 (see FIG. 4). The sensor system 38 may also or alternatively include one or more sensors other than those described above.

Figure 8:
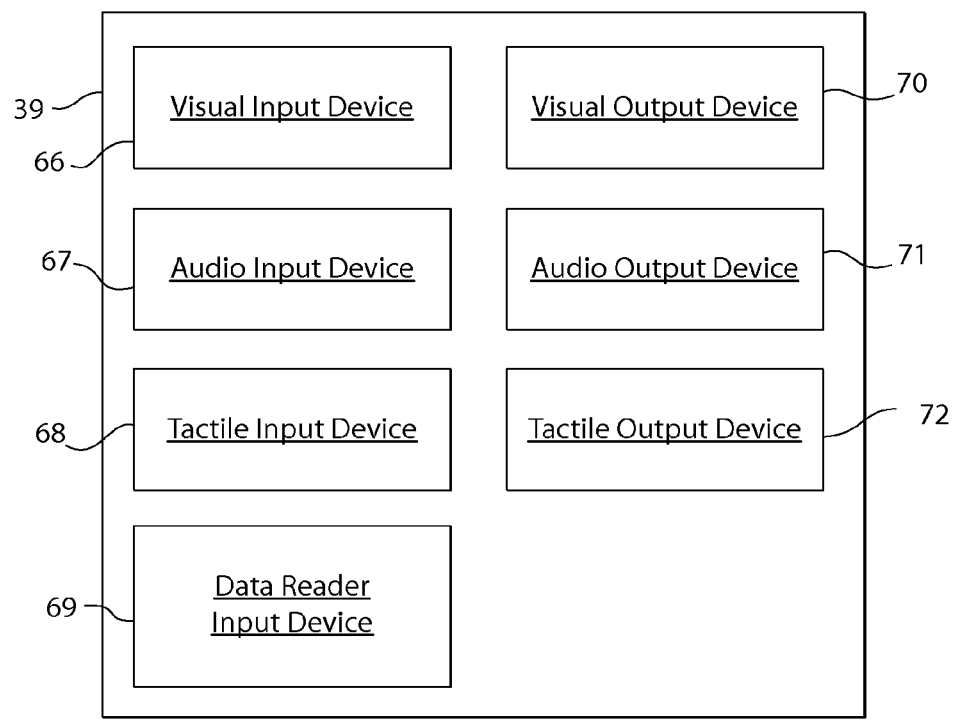
FIG. 8 is a block diagram of a user interface for the mobile robot.

Referring to FIG. 8, the user interface 39 includes one or more information input and/or output (I/O) devices 66-72. The I/O devices 66-69 are adapted to receive information from an individual (or individuals). The I/O devices 70-72 are adapted to electronically present information to an individual (or individuals). The information may be provided to and/or presented by the user interface 39 in a visual form, an audible form and/or a tactile form. The information may also or alternatively be provided to the user interface 39 electronically; e.g., through a data transfer. While various examples of I/O devices are described below, the user interface 39 may also or alternatively include I/O device(s) other than those described herein.

Figure 4:
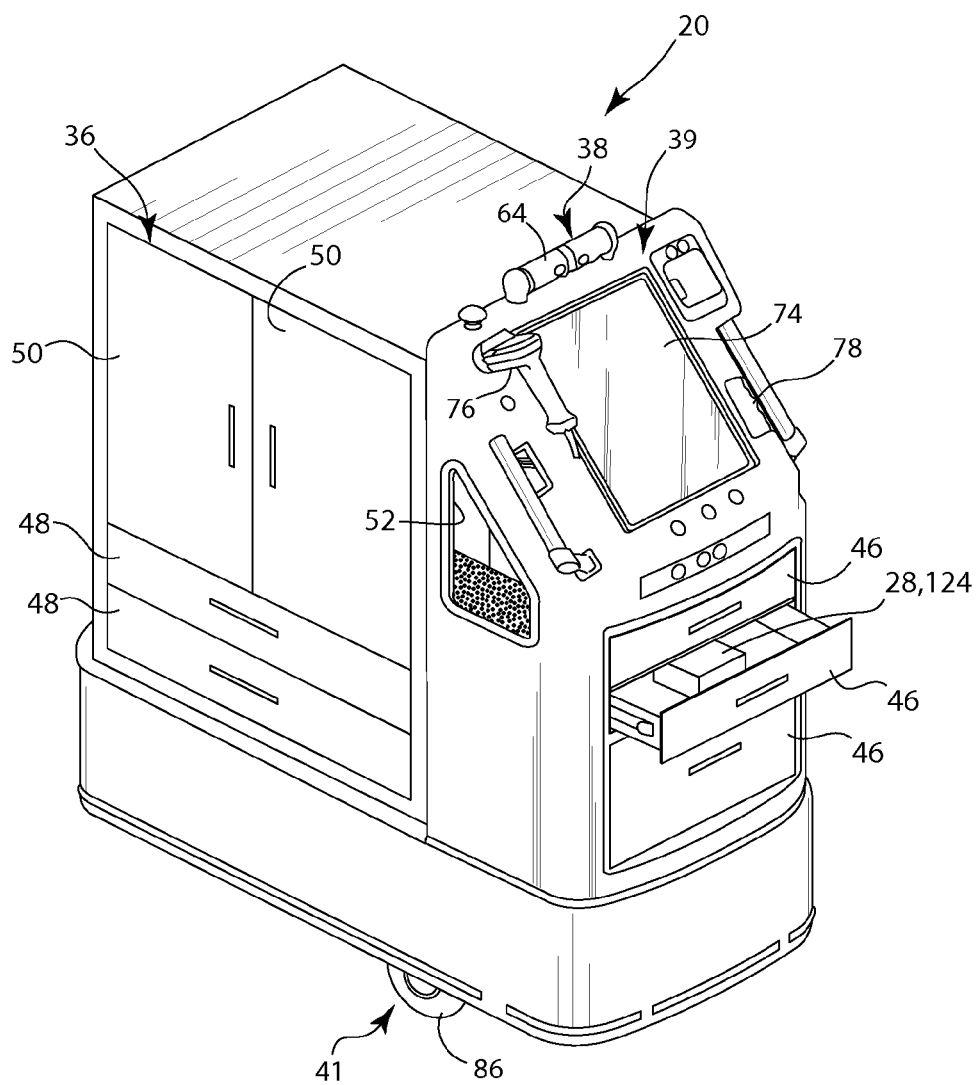
FIG. 4 is a perspective illustration of an embodiment of the mobile robot.

Referring to FIGS. 4 and 8, the I/O device 66 is configured as a visual input device for receiving visual information from the individual(s). An example of such a visual input device is a camera (e.g., the camera 64) configured with a gesture recognition system. Examples of a gesture include, but are not limited to, a hand signal and/or an arm signal. Another example of such a visual input device is a bio-information sensor (e.g., scanner) such as, for example, an eye retinal sensor, a fingerprint sensor and a handprint sensor.

The I/O device 67 is configured as an audio input device for receiving audible information from the individual(s). An example of such an audio input device is an electro-acoustic transducer (e.g., a microphone) configured with a voice recognition system.

The I/O device 68 is configured as a tactile input device through which the individual(s) may physically input information. An example of such a tactile input device is an electronic selection device, which may include a track pad, a touch pad, a track ball, a mouse, and/or a joystick. Other examples of a tactile input device include a keyboard and a keypad. Another example of a tactile input device is a touch screen 74.

The I/O device 69 is configured as a data reader input device for electronically reading or otherwise receiving information from another object or device (e.g., an identification (ID) card). Examples of such a data reader input device include a barcode scanner 76, a microchip (e.g., security chip) reader and a card reader 78.

The I/O device 70 is configured as a visual output device for presenting information to the individual(s) in a visual form. An example of such a visual output device is a display screen such as, for example, a liquid crystal display (LCD) screen, a light emitting diode (LED) display screen, and a plasma display screen. Such a display screen may be configured with one or more sensors to provide a touch screen (e.g., the touch screen 74). Another example of a visual output device is a printer such as, for example, a laser printer, an inkjet printer, or a thermal printer.

The I/O device 71 is configured as an audio output device for presenting information to the individual(s) in an audible form. An example of such an audio output device is an electro-acoustic transducer such as a loudspeaker.

The I/O device 72 is configured as a tactile output device for presenting information to the individual(s) in a tactile form. Examples of such a tactile output device may include a Braille display and a refreshable Braille terminal. Such devices may also be configured as tactile input devices.

Referring to FIGS. 2 and 3, the communication system 40 is adapted to receive data from at least one remote computer system 80. Examples of such a remote computer system include, but are not limited to, a kiosk, a personal computer (e.g., a desktop or laptop computer), a tablet computer, a mobile telephone (e.g., a smart phone), a personal digital assistant (PDA), and a central computer system. The communication system 40 is also adapted to send (e.g., transmit) data to at least one remote computer system 80. The communication system 40 includes a cellular, satellite and/or radio receiver 82. The communication system 40 also includes a cellular, satellite and/or radio transmitter 84. The communication system 40 may also include at least one port for receiving a wired connection to the remote computer system where, for example, the mobile robot 20 is docked at a station.

The drive system 41 is adapted to move the mobile robot 20 within its operating environment 22; e.g., inside and/or outside of the facility. The drive system 41 includes one or more drive system components 86. One or more of these components 86 may each be configured as a propulsion device. One or more of the components 86 may also each be configured as a steering device. The drive system 41 of FIG. 5, for example, includes one or more motorized drive wheels 88 and one or more steerable wheels 90. In another example, the drive system 41 of FIG. 7 includes one or more motorized (e.g., robotic and multi-linkage) track systems 92. The drive system 41 may also or alternatively include one or more drive system components with configurations other than those described above and illustrated in the drawings. For example, the steerable wheels 90 of FIG. 5 may also be configured as motorized drive wheels 88 and/or the motorized drive wheels 88 may also be configured as steerable wheels 90.

Referring to FIG. 3, the manipulator system 42 includes one or more manipulators 94. One or more of these manipulators 94 may be adapted to move, or assist with the movement of, one or more of the items 28 onto or into one or more of the item supports 36. One or more of the manipulators 28 may be adapted to move, or assist with the movement of, one or more of the items 28 off or out of one or more of the item supports 36. One or more of the manipulators 94 may also or alternatively be adapted to distribute, or assist with the distribution of, one or more of the items 28 from one or more of the item supports 36.

Figure 9:
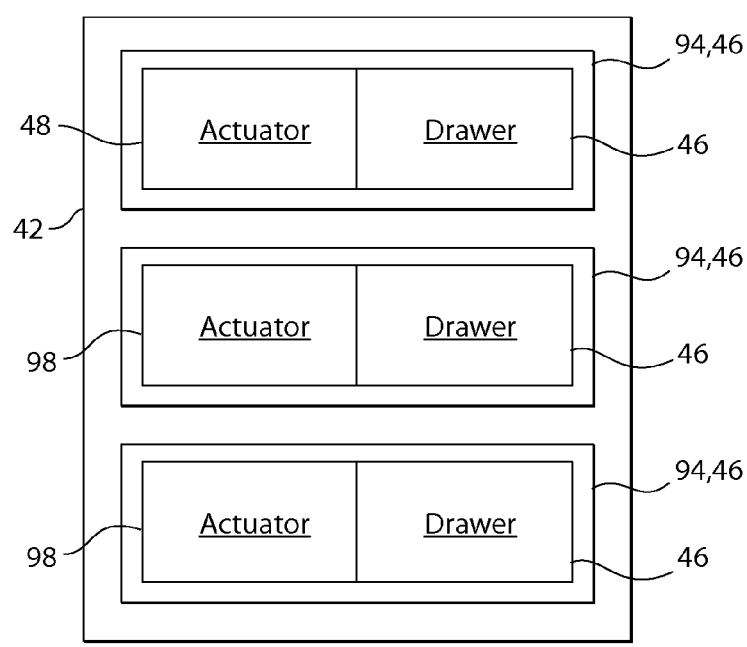
FIG. 9 is a block diagram of a manipulator system for the mobile robot.

Referring to FIGS. 4 and 9, one or more of the manipulators 94 may each be configured as a robotic drawer 96. Each robotic drawer 96 includes a respective one of the drawers 46 and at least one actuator 98, which is adapted to open and/or close the drawer 46. Examples of an actuator include, but are not limited to, an electric motor, a hydraulic or pneumatic pump, and a hydraulic cylinder.

One or more of the drawers 48 may also each be configured as a robotic drawer. One or more of the cabinet doors 50 may each be configured as a robotic cabinet door. For example, each drawer 48 may be opened and/or closed by at least one respective actuator. Each cabinet door 50 may be opened and/or closed by at least one respective actuator. Alternatively, one or more of the drawers 46, 48 and/or one or more of the cabinet doors 50 may each be configured as a manual drawer or cabinet door.

Referring to FIG. 5, one or more of the manipulators 94 may each be configured as a component 100 of the item dispenser 56. This dispenser component 100 is adapted to dispense or otherwise direct and/or release one or more of the items 28 from a respective one of the internal compartments 54 to an external compartment 102; e.g., an open bin. The dispenser component 100 may include rollers that may grip and move an item. The dispenser component 100 may also or alternatively include a dispenser door connected to at least one actuator. This actuator may open and/or close the dispenser door to permit at least one of the items to move from the internal compartment 54 to the external compartment 102.

The item dispenser 56 may have various configurations other than those described above and illustrated in the drawings. For example, the item dispenser 56 may include one or more dispenser components from any type of consumable or electronic item vending machine. In another example, the item dispenser 56 may be configured as a pick-and-place machine. Such a pick-and-place machine may include a two, three or more axis manipulator that picks one of the items 28 from one of the internal compartments 54, and disposes the picked item into one of the external compartments 102.

Referring to FIGS. 6 and 7, one or more of the manipulators 94 may each be configured as a robotic manipulator arm 104. Each manipulator arm 104 may be electronically, hydraulically, pneumatically and/or mechanically actuated. Each manipulator arm 104 includes the end effector 60, which is connected to one or more arm members 106 (e.g., linkages). Examples of an end effector include, but are not limited to, a gripping device, a suction device, an electromagnet, a winch, a clasp, etc.

The manipulator system 42 may also or alternatively include various types of manipulators other than those described above and illustrated in the drawings. For example, one or more of the manipulators may each be configured as a pallet jack, a lift platform, a conveyor system, a slide carriage or a crane. Other examples of manipulators are disclosed in U.S. Pat. No. 7,902,784, U.S. Pat. No. 7,719,222 and U.S. Pat. No. 7,348,747, each of which is hereby incorporated herein by reference in its entirety.

Figure 10:
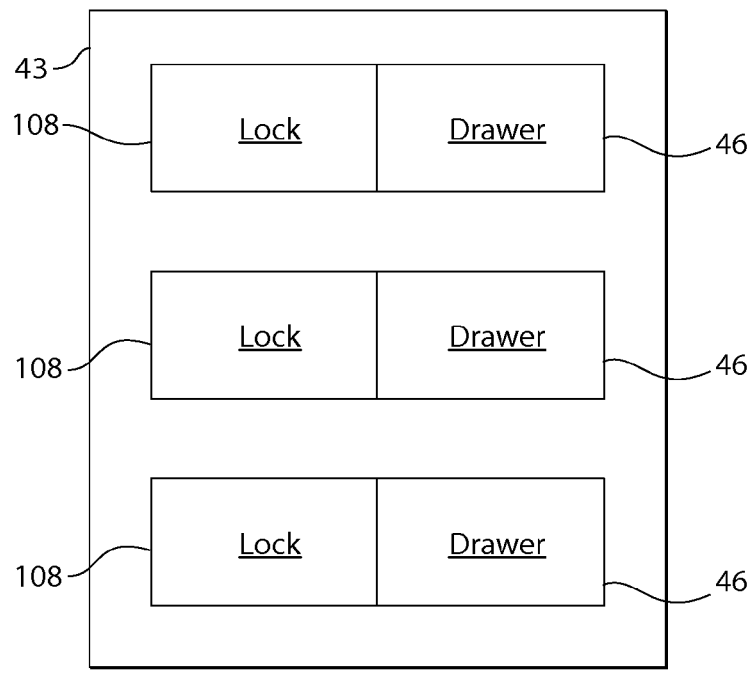
FIG. 10 is a block diagram of a security system for the mobile robot.

Referring to FIGS. 3, 4 and 10, the security system 43 is adapted to secure the item(s) 28 with (e.g., on or within) at least one of the item supports 36. The security system 43, for example, may include one or more electronically, hydraulically, pneumatically and/or mechanically actuated locks 108 such as, for example, a bolt or a latch. One or more of these locks 108 may each be adapted to secure (e.g., lock) a respective one of the drawers 46 in a closed position. In this manner, un-authorized individuals may be unable to access the respective item(s) 28 within the drawers 46. Similarly, one or more of the drawers 48 and/or one or more of the cabinet doors 50 may also or alternatively each be securable (e.g., held closed) with at least one electronically, hydraulically, pneumatically and/or mechanically actuated lock.

Referring to FIGS. 6 and 7, the security system 43 may include one or more of the end effectors 60. For example, each end effector 60 may grip an item to secure that item. Each end effector 60 may subsequently release the gripped item to provide access to the item. The item may be released, for example, by reducing clamping pressure on the item. Alternatively, the item may be released by disengaging (e.g., letting go of or dropping) the item.

Referring to FIG. 3, the security system 43 may also or alternatively include one or more security devices other than those described above and illustrated in the drawings. For example, the security system 43 may include one or more manually operated locks; e.g., a key lock, a combination lock, a pad lock, etc.

The controller 44 is in signal communication (e.g., hardwired or wirelessly connected) with the sensor system 38, the user interface 39, the communication system 40, the drive system 41, the manipulator system 42 and the security system 43. The controller 44 is implemented with a combination of hardware and software. The hardware includes memory 110 and a processing device 112 (or system), which includes one or more single-core and/or multi-core processors. The hardware may also or alternatively include analog and/or digital circuitry other than that described above.

The memory 110 may be a non-transitory computer readable medium, and configured to store software (e.g., program instructions) for execution by the processing device 112. The memory 110 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 11:
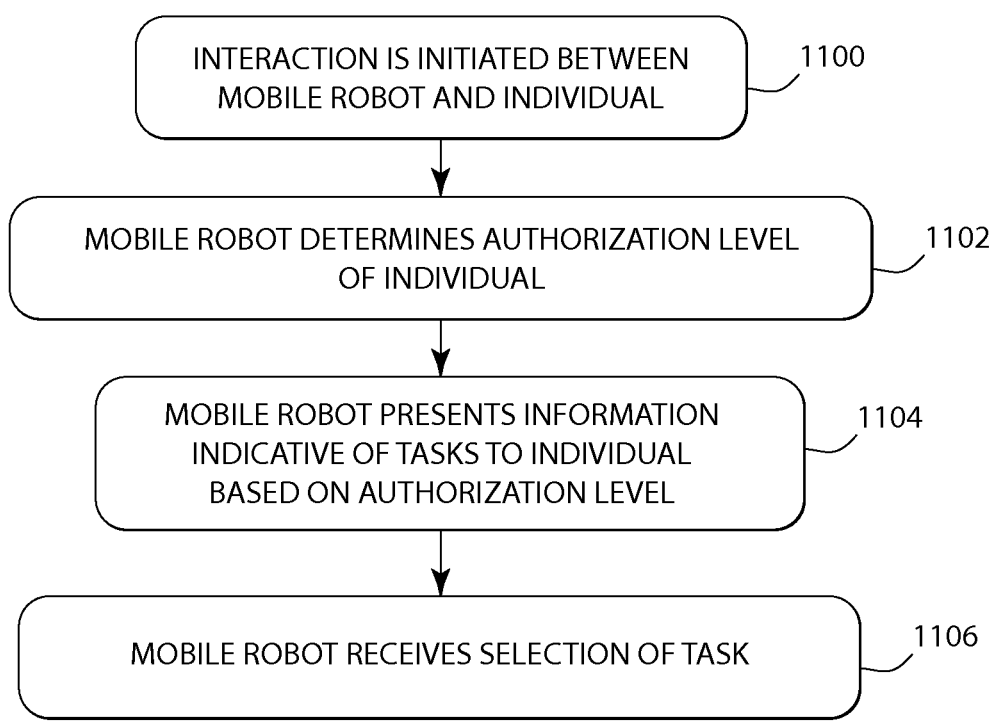
FIG. 11 is a flow diagram of a method involving the mobile robot.

FIG. 11 is a flow diagram of a method involving the mobile robot 20. This method is described below with reference to the mobile robot 20 of FIGS. 1, 3, 4 and 8 for illustrative purposes. The present method, however, may also be performed using a mobile robot with a configuration other than that described above and illustrated in the drawings. In addition, one or more of the following steps may be omitted or replaced with one or more additional steps.

In step 1100, an individual 26 (i.e., a potential user) initiates an interaction with the mobile robot 20. The individual 26, for example, may wave his/her arm(s) or make another gesture to flag down (e.g., stop) the mobile robot 20 as the mobile robot 20 is moving within the operating environment 22. The gesture, of course, may also be provided to signal the mobile robot 20 while stationary. The visual input device 66 may sense the gesture, and provide a signal indicative thereof to the controller 44. The controller 44 may subsequently signal the drive system 41 to autonomously move the mobile robot 20 towards and/or stop proximate (e.g., in front of) the individual 26 for further interaction with that individual 26.

The individual 26 may also or alternatively initiate the interaction by providing an audible signal and/or a tactile signal to the mobile robot 20. The individual 26, for example, may provide a vocal command, which may be sensed by the audio input device 67 and relayed to the controller 44. In another example, the individual 26 may touch and/or manipulate the tactile input device 68; e.g., press a virtual button on the touch screen 74. The tactile input device 68 may subsequently relay a signal indicative of the touch and/or manipulation to the controller 44.

Alternatively, the mobile robot 20 may initiate the interaction with the individual 26. The sensor system 38, for example, may sense the presence of the individual 26 proximate the mobile robot 20 or a designated location within the operating environment 22, and provide a signal indicative thereof to the controller 44. The controller 44 may subsequently signal the user interface 39 to visually, audibly and/or tactilely present a message to the individual 26 inquiring as to whether that individual 26 wants assistance.

In step 1102, the mobile robot 20 determines an authorization level of the individual 26. The authorization level provides information 24 regarding which of the selectable task(s) the mobile robot 20 is authorized to perform for the individual 26.

Examples of an authorization level may include a zero authorization level, a basic authorization level and an expanded authorization level. The zero authorization level indicates the mobile robot 20 is not authorized to perform any tasks for the individual 26. Such an authorization level may be assigned to an unknown individual such as an unregistered visitor or guest of the facility. The basic authorization level indicates the mobile robot 20 is authorized to perform a limited number and/or types of the selectable tasks for the individual 26. Such an authorization level may be assigned to a known individual such as a registered visitor or guest of the facility. The expanded authorization level indicates the mobile robot 20 is authorized to perform a more expansive number and/or types of the selectable tasks for the individual 26. Such an authorization level may be assigned to a known individual such as an employee of the facility.

Alternatively, each authorization level may relate to a particular task (or tasks), or a particular type (or types) of tasks, which the mobile robot 20 may perform for the individual 26. For example, the mobile robot 20 may be authorized to perform a first task for an individual with a first authorization level. The mobile robot 20 may be authorized to perform a second task for an individual with a second authorization level. This method, however, is not limited to any particular types or numbers of authorization levels.

The mobile robot 20 may determine the authorization level by identifying the individual 26. The user interface 39, for example, may capture an image of the individual 26 and/or record a voice of the individual 26 to provide identity data. This identity data may thereafter be processed with facial and/or voice recognition software to identify the individual 26. Upon identifying the individual 26, the controller 44 may determine which authorization level that individual 26 has been assigned using, for example, a lookup table. However, where the individual 26 cannot be identified, the controller 44 may automatically assign that individual a predetermined authorization level; e.g., the zero or basic authorization level.

The mobile robot 20 may also or alternatively determine the authorization level based on security data received from the individual 26 through, for example, the data reader input device 69. The individual 26 may swipe his/her identification (ID) card or badge through the card reader 78 in response to receiving a prompt from the mobile robot 20. The controller 44 may receive data from the user interface 39 indicative of an identification (or security level) encoded on the ID card. The controller 44 may subsequently process the encoded identification data to determine which authorization level that individual 26 has been assigned using, for example, a lookup table. The mobile robot 20 may, of course, also or alternatively use one or more security techniques other than those described above to determine the authorization level for the individual 26. For example, the individual 26 may provide his/her name, username and/or alphanumeric password using the audio and/or the tactile input devices. The mobile robot 20 may also or alternatively scan a finger, a hand, an eye retinal and/or another body part of the individual to determine the authorization level for the individual 26.

In step 1104, the mobile robot 20 electronically presents information 24 to the individual 26. This information 24 is indicative of one, some or each of the tasks the individual 26 is authorized to select based on his/her authorization level.

Figure 12:
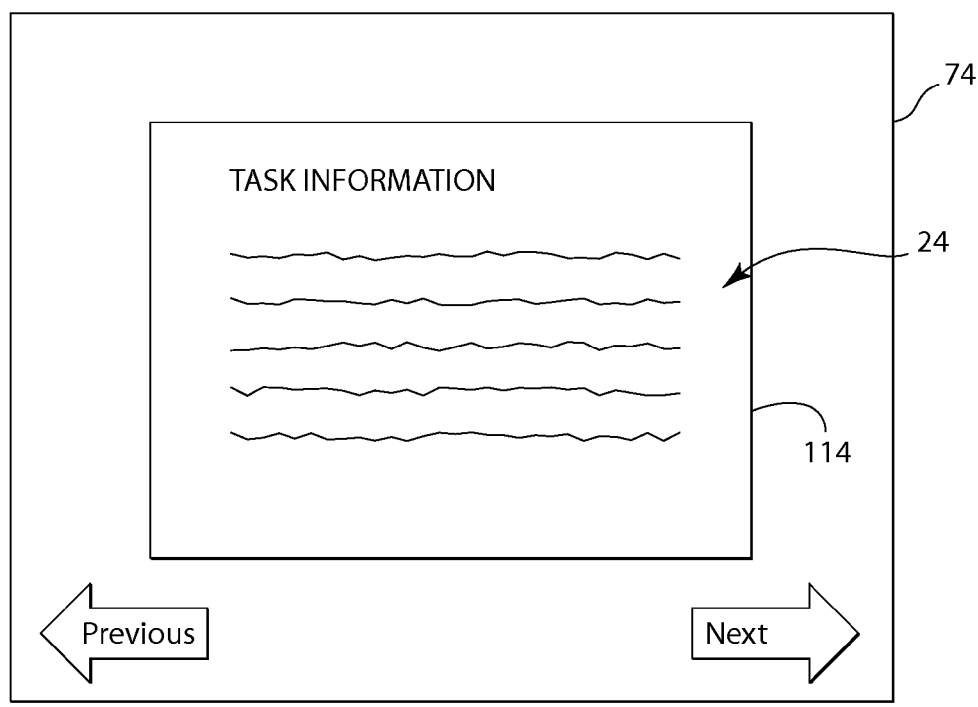
FIG. 12 is an illustration of a display screen visually presenting information according to a layout.
Figure 13:
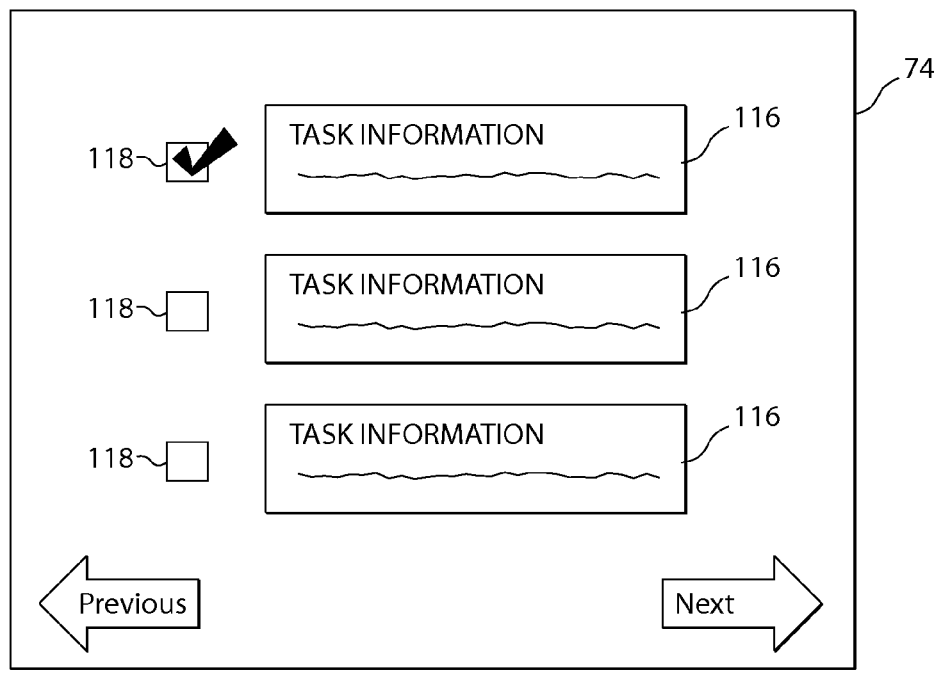
FIG. 13 is an illustration of a display screen visually presenting information according to another layout.
Figure 14:
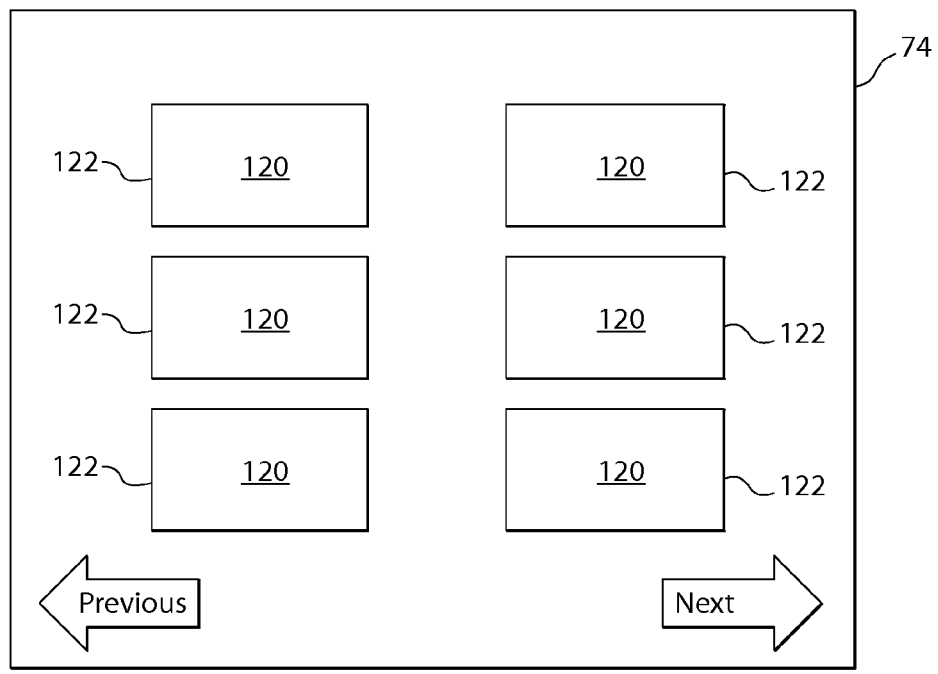
FIG. 14 is an illustration of a display screen visually presenting information according to another layout.

The information 24 may be presented in a visual form, an audible form and/or a tactile form using the user interface 39. For example, the information 24 may be visually presented using the visual output device 70; e.g., the touch screen 74. Referring to FIG. 12, a respective portion of the information 24 regarding each task may be discretely (e.g., individually) presented in its own window 114. Alternatively, referring to FIGS. 13 and 14, respective portions of the information 24 indicative of at least some of the tasks may be presented contemporaneously; e.g., in the same window. In the embodiment of FIG. 13, a portion of the information 24 relating to each respective task is visually presented via a textual and/or graphical description 116 located next to a checkbox 118 or selectable icon. In the embodiment of FIG. 14, a portion of the information 24 relating to each task is visually presented via a textual and/or graphical description 120 located within a selectable icon 122. One of the icons 122, for example, may include a picture of a product that the mobile robot 20 may order, gather, transport and/or deliver. Another one of the icons 122 may include a picture representing a service the mobile robot 20 may perform; e.g., a housekeeping service. The user interface 39, of course, may also or alternatively present the information 24 in various manners other than those described above and illustrated in the drawings.

In step 1106, the mobile robot 20 receives a selection of at least one of the selectable tasks. The individual 26, for example, may touch the touch screen 74 on or proximate one of the icons 122 to select the task related to that icon. Referring to FIGS. 3 and 4, the touch screen 74 may sense the user touch. The user interface 39 may subsequently provide selection data to the controller 44 indicative of the selected task. The selection data may subsequently be processed by the controller 44 to provide command data.

Upon generating the command data, the mobile robot 20 may autonomously perform at least a portion or substantially all of the selected task(s). The controller 44, for example, may signal one or more of the components 39-43 to perform the task(s) based on signals received from the sensor system 38 and the command data. Using the method of FIG. 11 therefore untrained individuals may operate the mobile robot 20 without first receiving specialized training.

In some embodiments, the command data may also be indicative of supplemental information relating to the performance of the selected task. Examples of supplemental information include, but are not limited to:

when the task(s) should be performed and/or completed;
where at least a portion of the task(s) should be performed;
priority indicator(s) for the task(s); and/or
identity(ies) of the individual(s).

Each priority indicator informs the controller 44 about an urgency with which a respective task should be performed. For example, a task of delivering medication for a patient in a critical care ward may have a relatively high priority indicator. By contrast, a task of delivering food to a patient in a general care ward may have a relatively low priority indicator.

Figure 15:
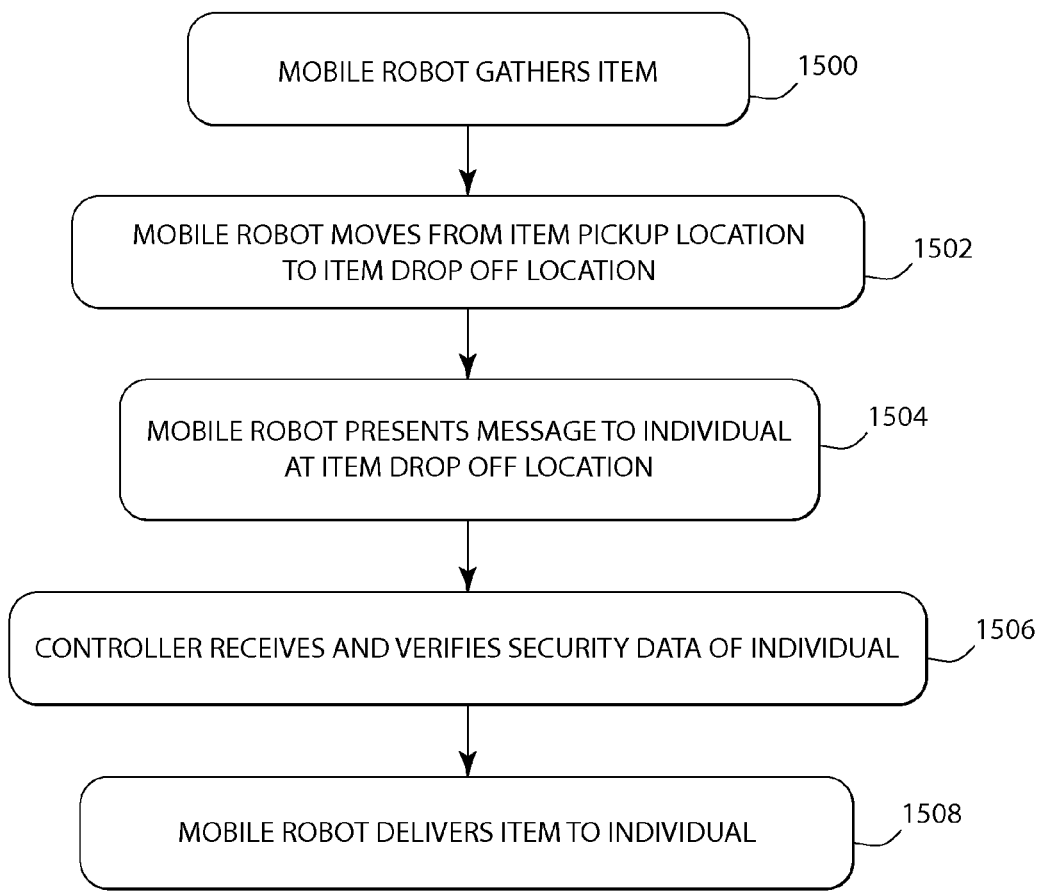
FIG. 15 is a flow diagram of a method for performing a task with the mobile robot.

FIG. 15 is a flow diagram of a method for performing an ordered item fulfillment task with the mobile robot 20. This method is described below as being performed with the mobile robot 20 of FIGS. 2, 3, 4 and 8 in a facility such as a hospital for illustrative purposes. The task is selected by an individual such as a medical doctor using, for example, the method of FIG. 11. The task includes gathering an item such as medication 124, which was ordered by the doctor, at a pickup location such as a hospital pharmacy 126. The task also includes delivering the ordered medication 124 to an individual such as a patient at a drop off location such as a patient room 128. The method of FIG. 15, however, is not limited to any particular mobile robot configurations, operational environments, types of items, or method participants.

In step 1500, the mobile robot 20 gathers the ordered medication 124. The controller 44, for example, may signal the drive system 41 to move the mobile robot 20 to the pharmacy 126 based on signals received from the sensor system 38 and/or the command data. At the pharmacy 126, the controller 44 may signal the user interface 39 to electronically present a message to an individual (e.g., a pharmacist) requesting that the ordered medication 124 be loaded into (or on) one of the item supports 36 such as the drawer 46. The controller 44, for example, may signal the user interface 39 to visually display the message to the pharmacist on its display screen (e.g., the touch screen 74). The controller 44 may also or alternatively signal the user interface 39 to audibly reproduce the message using its electro-acoustic transducer. Once the ordered medication 124 is within the drawer 46, the mobile robot 20 may receive instructions from the pharmacist through the user interface 39 to close and/or secure the drawer 46 using the manipulator system 42 and/or the security system 43. In this manner, unauthorized individuals may be unable to access the now secured medication 124.

In step 1502, the mobile robot 20 moves from the pharmacy 126 to the patient room 128. The controller 44, for example, may signal the drive system 41 to move the mobile robot 20 from the pharmacy 126 to the patient room 128 based on signals received from the sensor system 38 and/or the command data. In some embodiments, the mobile robot 20 may travel directly from the pharmacy 126 to the patient room 128. In other embodiments, the mobile robot 20 may perform one or more other tasks while traveling from the pharmacy 126 to the patient room 128.

In step 1504, the mobile robot 20 electronically presents a message to the patient at the patient room 128. The controller 44, for example, may signal the user interface 39 to visually display the message to the patient on its display screen (e.g., the touch screen 74). The controller 44 may also or alternatively signal the user interface 39 to audibly reproduce the message using its loudspeaker. The message may provide the patient with directions on how to access the ordered medication 124. For example, the message may indicate in which drawer 46 the ordered medication 124 is located. The message may also or alternatively indicate how the patient may identify himself/herself to the mobile robot 20 as the intended recipient of the ordered medication 124 and/or sign for the ordered medication 124.

In step 1506, the controller 44 receives and verifies security data from the user interface 39. The patient, for example, may swipe his/her ID card through the card reader 78 of the user interface 39 in response to seeing and/or hearing the message of the step 1504. The user interface 39 may subsequently generate the security data based on data obtained from the ID card. The controller 44 may subsequently compare this security data to predetermined security data to determine whether the patient is authorized to receive the medication 124.

In step 1508, the mobile robot 20 delivers the ordered medication 124 to the patient where, for example, the security data corresponds to the predetermined security data.

The controller 44, for example, may signal the security system 43 and/or the manipulator system 42 to unlock and/or open the drawer 46 to provide the patient access to the ordered medication 124.

In some embodiments, the mobile robot 20 may autonomously deliver an item 28 using the item dispenser 56 of FIG. 5. In such embodiments, commonly ordered items 28 may be pre-loaded into the internal compartments 54 such that the mobile robot 20 does not need to gather the items 28 at the pickup location(s) 30 for each order. One or more of the items 28, of course, may alternatively be loaded into the internal compartment(s) 54 as needed. At the drop off location 32 or 34, the controller 44 may signal the dispenser component 100 to direct one of the items 28 from a respective one of the internal compartments 54 to the external compartment 102 where it may be accessed by an individual; e.g., a nurse or patient.

In some embodiments, the mobile robot 20 may autonomously gather an item 28 from a pickup location 30. For example, referring to FIGS. 3 and 6, the controller 44 may signal the manipulator system 42 to pick up the item using one or more of the manipulator arms 104. The end effector 60, for example, may engage (e.g., grip) the item 28 utilizing one of a plurality of gripping techniques, and the arm members 106 may lift the item 28 up. The end effector 60 may then continue to grip the item 28 until the item 28 is delivered. Alternatively, the manipulator arm 104 may place the item 28 onto (or into) one of the item supports 36; e.g., the platform 58. Similarly, the mobile robot 20 may also or alternatively autonomously deliver the item 28 to the recipient.

In some embodiments, the mobile robot 20 may take an image (e.g., a picture or video) of the recipient(s) of the item(s) 28 using the camera 64 of the user interface 39. The image may be taken before delivering the item(s) 28 in order to verify the recipient is the intended authorized recipient using, for example, facial recognition software. The image may also or alternatively be taken during and/or after delivery of the item(s) 28 to record who received the item 28. Similarly, a voice of the recipient(s) may be recorded before, during and/or after the delivery of the item(s) 28 to verify the recipient's identity and/or to keep a record of the recipient. The mobile robot 20, of course, may use one or more security techniques other than those described above to verify the recipient as the intended recipient. For example, the mobile robot 20 may receive an audible or alphanumeric password from the recipient. The mobile robot 20 may also or alternatively scan a finger, a hand, an eye retinal and/or other body part of the recipient, etc.

In some embodiments, the mobile robot 20 may perform a plurality of tasks (e.g., item deliveries), which are selected by one or more individuals 26. The mobile robot 20, for example, may receive a plurality of items 28 respectively associated with first and second tasks at the pickup location 30 (or multiple pickup locations). The mobile robot 20 may subsequently deliver the item(s) 28 associated with the first task at the first drop off location 32 on the way to delivering the item(s) 28 associated with the second task at the second drop off location 34. Alternatively, the mobile robot 20 may receive and deliver the item(s) 28 associated with the first task before receiving and delivering the item(s) 28 associated with the second task. Still alternatively, the mobile robot 20 may receive and/or deliver the item(s) 28 associated with one of the tasks during performance of another one of the tasks. Of course, in some embodiments, the mobile robot 20 may not stop to receive an additional task when the task the mobile robot 20 is currently performing has a relatively high priority.

The tasks may be scheduled for fulfillment by the mobile robot 20 using one or more scheduling criteria. Examples of the scheduling criteria include, but are not limited to, the following:

priority indicators for one or more of the items;
when the selections of the tasks were placed;
when the command data was received by the mobile robot;
where items associated with the tasks are located for pickup;
where items associated with the tasks are to be delivered;
where the mobile robot is currently located, or is scheduled to be located;
distance between respective pickup and drop off locations;
travel time between respective pickup and drop off locations;
identity of individuals who selected the tasks;
storage requirements for items associated with tasks; and/or
cost of items associated with tasks.

For example, the controller 44 may schedule delivery of a first item at the first drop off location 32 (e.g., a nurse station in an emergency room) before delivery of a second item at the second drop off location 34 (e.g., a patient room) where the first item has a higher priority indicator. In another example, the controller 44 may schedule delivery of a first item at the first drop off location 32 before delivery of a second item at the second drop off location 34 where the first drop off location 32 is located on the same floor of the facility as the pickup location 30, whereas the second drop off location 34 is located on another floor. The present disclosure, of course, is not limited to the foregoing examples.

As described above, the mobile robot 20 may charge its power storage device(s) (e.g., batteries) and/or perform various other tasks during and/or between performance of one or more of the selected tasks. For example, the mobile robot 20 may dock at a charging station to charge its power storage device(s), or swap its depleted power storage device(s) for charged power storage device(s). The mobile robot 20 may also or alternatively include a wireless energy receiver that receives energy from a wireless energy transmitter. Examples of a wireless energy receiver and a wireless energy transmitter are disclosed in U.S. patent application Ser. No. 13/773,689, which is hereby incorporated herein by reference in its entirety.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method involving a mobile robot that includes a user interface, the method comprising:
determining an authorization level of an individual;
electronically presenting information to the individual using the user interface based on the authorization level, wherein the information is indicative of a first task; receiving a selection of the first task at the user interface;
autonomously performing at least a portion the first task using the mobile robot; and
performing at least a portion of a second task using the mobile robot; and interrupting the performance of the at least the portion of the second task to electronically present the information and receive the selection of the first task.

2. The method as defined in claim 1, further comprising scheduling the performance of the at least the portion of the first task and the at least the portion of the second task based on a priority indicator associated with at least one of the first task or the second task.

3. The method as defined in claim 1, further comprising:
receiving a signal that initiates an interaction between the mobile robot and the individual;
wherein the selection is received from the individual.

4. The method as defined in claim 1, wherein the performing of the at least the portion the first task comprises using one or more components of the mobile robot to move the mobile robot from a first location to a second location.

5. The method as defined in claim 1, wherein the performing of the at least the portion of the first task comprises using a manipulator system of the mobile robot to move an item related to the first task.

6. The method as defined in claim 1, wherein the performing of the at least the portion of the first task comprises using one or more components of the mobile robot to order an item related to the first task.

7. The method as defined in claim 1, wherein the information is further indicative of one or more additional selectable tasks.

8. The method as defined in claim 1, wherein the electronically presenting of the information comprises presenting the information in a visual form using a display screen of the user interface.

9. The method as defined in claim 1, wherein the receiving of the selection comprises sensing an audible command using a microphone of the user interface, which audible command is indicative of the selection of the first task.

* * * * *